US 6,487,051 B1

(12) United States Patent
Koyanagi et al.

(10) Patent No.: US 6,487,051 B1
(45) Date of Patent: Nov. 26, 2002

(54) RAMP FOR INFORMATION RECORDING DISK APPARATUS

(75) Inventors: Ichiroh Koyanagi, Yokohama (JP); Tsai-Wei Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 09/711,340

(22) Filed: Nov. 9, 2000

(30) Foreign Application Priority Data

Feb. 9, 2000 (JP) ........................................ 2000-031985

(51) Int. Cl.7 .............................................. G11B 21/22
(52) U.S. Cl. ..................................................... 360/254.8
(58) Field of Search ................................ 360/254–254.9

(56) References Cited

U.S. PATENT DOCUMENTS 5,408,375 A * 4/1995 Asano ...................... 360/254.8
5,875,074 A * 2/1999 Ho et al. .................. 360/254.8
5,995,332 A * 11/1999 Patterson .................. 360/254.3
6,078,474 A * 6/2000 Koyanagi et al. ......... 360/254.8
6,226,155 B1 * 5/2001 Watanabe et al. ......... 360/254.8

* cited by examiner

Primary Examiner—Allen Cao
(74) Attorney, Agent, or Firm—Robert B. Martin; Bracewell & Patterson, L.L.P.

(57) ABSTRACT

A ramp 200 has an attaching portion 221 and an arm holding portion 222. The attaching portion is molded with high polymer material so that the attaching portion has a screw hole 25 for fixing the ramp to the housing of an information recording disk apparatus by a screw. The arm holding portion is molded with high polymer material whose fiction coefficient is small, and the arm holding portion has a storing portion 27 to hold the suspension arm retracted from the recording disk and also has a guide portion 28 against which the suspension arm slides so that it is easily moved in and out of the storing portion 27. The attaching portion 221 and the arm holding portion 222 are united in one by subsequently molding the attaching portion and the arm holding portion.

10 Claims, 10 Drawing Sheets

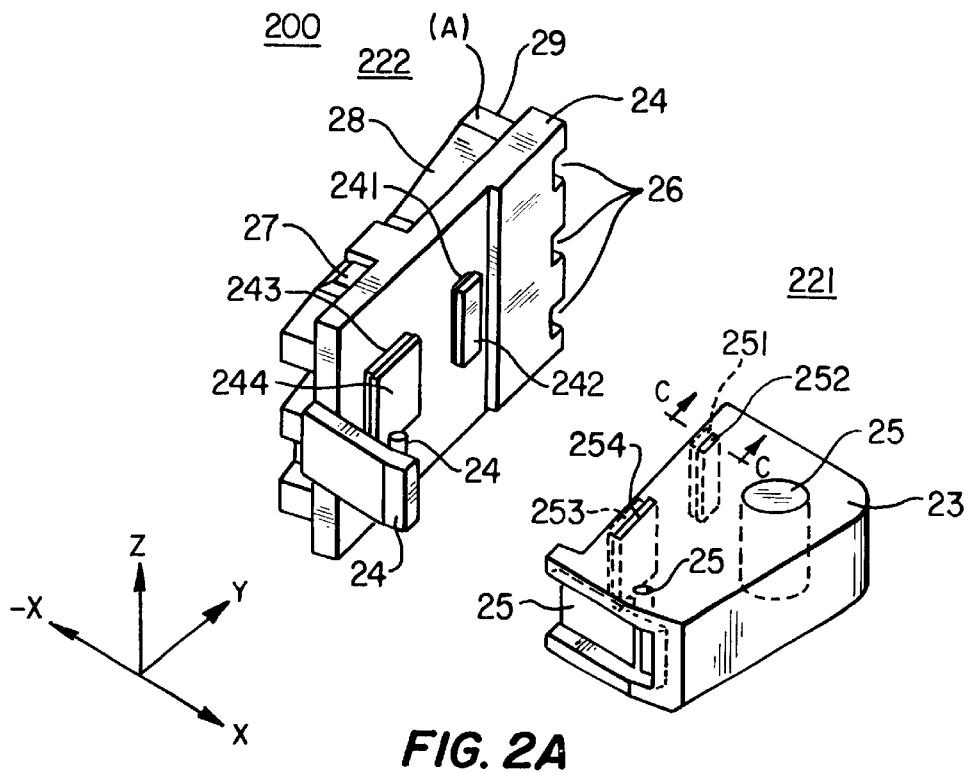
FIG. 2A
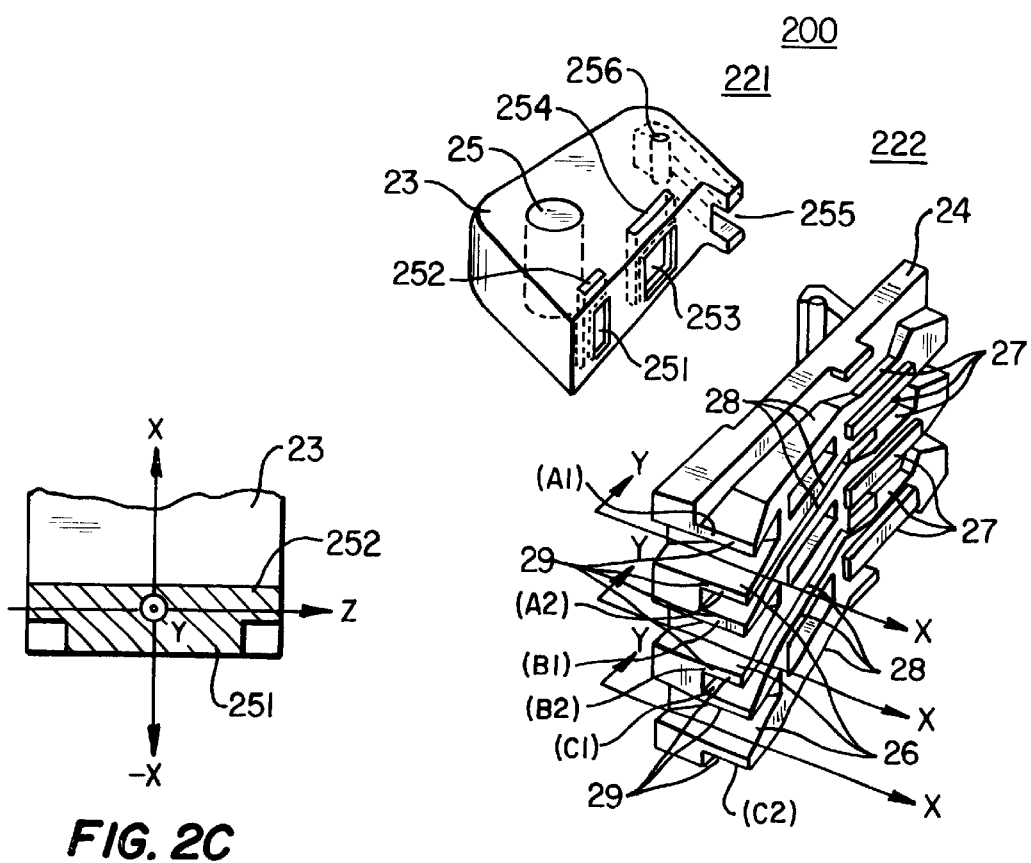
FIG. 2C
FIG. 2B

NOTES)

LI UP : GAP DISTANCE BETWEEN AN UPPER DISK SURFACE AND A RAMP SLOT
LI DOWN : GAP DISTANCE BETWEEN A LOWER DISK SURFACE AND A RAMP SLOT
L2 : DISTANCE BETWEEN A POINT, AT WHICH A SUSPENSION ARM CONTACTS A RAMP LAST OR FIRST, AND A DISK

NOTES)

L1 UP : GAP DISTANCE BETWEEN AN UPPER DISK SURFACE AND A RAMP SLOT
L1 DOWN : GAP DISTANCE BETWEEN A LOWER DISK SURFACE AND A RAMP SLOT
L2 : DISTANCE BETWEEN A POINT, AT WHICH A SUSPENSION ARM CONTACTS A RAMP LAST OR FIRST, AND A DISK

RAMP FOR INFORMATION RECORDING DISK APPARATUS

BACKGROUND OF THE INVENTION

1. Technical Field

The present invention relates to the structure of a ramp, which retracts a suspension arm, which holds magnetic heads for reading or writing information from or to a recording disk of an information recording disk apparatus being rotated at high speeds, from the recording disk when the disk is not operated and then holds the retracted suspension arm.

2. Description of the Related Art

In information recording apparatuses employed in information processors such as computers or the like, the hard disk apparatus is an information recording disk apparatus employing a magnetic recording disk, which rotates at high speeds, as a recording medium. The hard disk apparatus rotates a plurality of magnetic recording disks (hereinafter stated as "recording disks") at high speeds and reads and writes information by magnetic heads provided to correspond to the upper and lower surfaces of each recording disk.

The magnetic head used in the hard disk apparatus is supported by a suspension arm that is driven by an actuator, and moves over the recording disk at high speeds. Unless the magnetic head crashes, it never touches the recording disk, and the high rotational speed of the recording disk creates a thin cushion of air that floats the magnetic head off the disk by a very small amount.

The magnetic head is required not to contact the recording disk even when the disk does not rotate. This is because there is a possibility that the magnetic head will be fixedly attached on the surface of the recording disk, if the magnetic head contacts the disk for a long period of time when the disk is not rotating. If the magnetic head is fixedly attached on the disk surface, the start of rotation of the recording disk will separate the fixedly attached portion from the disk surface and destroy the disk surface.

The magnetic head is also required not to contact the recording disk even for such a short time that the magnetic head is not fixedly attached on the disk surface. For example, in the case where the magnetic head is contacted with the recording disk not being rotated, there is a possibility that the disk surface will be shaved due to friction which occurs when the magnetic head contacts the disk, during the time that the disk starts rotating and reaches a predetermined rotational speed. Generally, in order to float the magnetic head off the recording disk, the disk is required to have reached the predetermined rotational speed.

As described above, it is necessary that the magnetic head remains retracted from the recording disk until the disk reaches the predetermined rotational speed. For this reason, a magnetic-head holding mechanism called a ramp is recently known. The ramp is used to retract the magnetic head and the suspension arm from the recording disk and hold the retracted magnetic head, when the recording disk is less than the predetermined rotational speed.

The hard disk apparatuses in recent years are provided with a ramp that functions as a saving place for holding the magnetic head retracted from the recording disk during the stop of rotation of the disk and during low rotation. Such a hard disk apparatus unloads the magnetic head to the ramp if the rotational speed of the disk is reduced and becomes less than a rotational speed at which the magnetic head cannot float, and loads the magnetic head over the disk if the rotational speed of the disk rises and reaches an enough rotational speed to float the magnetic head. The method of unloading or loading the magnetic head from or to the ramp, as described above, is called a ramp loading method.

The ramp is molded and manufactured from high polymer material. The ramp is screwed to the housing of the hard disk apparatus and subjected to stress in the direction of compression in which it is pushed against the housing by the tightening torque of the screw. Therefore, if a long period of time passes, creep deformation which is plastic deformation will occur in the ramp formed from high polymer material.

In addition, the information recording disk apparatus has incorporated a motor, a driver circuit or the like to rotate the recording disk at high speeds, so it cannot be avoided that the temperature in the inside of the information recording disk apparatus will rise because of heat generated by the components. Therefore, the surrounding temperatures of the ramp also rise during high rotation of the recording disk and decrease and approach normal temperature during the stop of rotation of the recording disk. That is, the ramp is used under the condition that-temperature changes in a cycle. In that case, as also evident in the field of reliability tests that a temperature cycle accelerates time, for example, creep deformation is liable to occur with the passage of time.

FIG. 7 is a plan view showing a conventional magnetic recording disk apparatus employing the ramp. A magnetic recording disk apparatus 10 illustrated in FIG. 7 houses recording disks 17, a rotary actuator assembly 12, a voice coil motor 16, and a ramp 20 in the inside of a housing 11 and forms an airtight space in the inside. Each of the recording disks 17 has magnetic recording layers on the upper and lower surfaces and are stacked and fixedly attached to a spindle shaft 18. Each disk is rotated integrally with the spindle shaft 18 by a spindle motor (not shown). The upper and lower surfaces of each of the recording disks 17 are used as the information recording surfaces, and a dedicated magnetic head (not shown) is employed with respect to each surface. The actuator assembly 12 has suspension arms 14 stacked by the same number as the information recording surfaces and is supported by a pivot shaft 13. A slider 19 is attached to the front end of each suspension arm 14 and provided with magnetic heads that scan the upper and lower information recording surfaces of each disk. Furthermore, a lifting protrusion 15 is attached to the front end of the suspension arm 14.

The actuator assembly 12 is rotated on the pivot shaft 13 by the voice coil motor 16 so that the slider 19 with the magnetic heads is loaded over the surface of the recording disk 17 or unloaded to the ramp 20. The suspension arms 14 are formed from elastic material and urged in the direction in which each slider 19 attached to each suspension arm 14 approaches the corresponding disk surface of the recording disk 17. If the force to float the slider 19, created by rotation of the recording disk 17, is balanced with the elastic force of the suspension arm 14, the slider 19 will be floated a predetermined distance off the surface of the recording disk 17 being rotated. The ramp 20 is fixed to the housing 11 of the magnetic recording disk apparatus 10 by employing a screw 31, at a position where the front ends of the ramp are near the recording disks 17 and alternately extend into between the disks without contacting any disks.

FIG. 8A is a perspective view showing a conventional ramp where all parts have been molded en bloc by employing high polymer material containing polytetrafluoroethylene (PTFE), and FIG. 8B shows another conventional ramp reinforcing a screw hole with a metal sleeve in the ramp of FIG. 8A. Note that FIGS. 8A and 8B show the ramps of the type that holds suspension arms in the case of stacking three double-sided recording disks.

As illustrated in FIG. 8A, the conventional ramp 20 is configured by an attaching portion 21 and an arm holding portion 22. The attaching portion 21 has a screw hole 25 for fixing the ramp 20 to the housing 11 of the information recording disk apparatus 10 by employing a screw 31. The arm holding portion 22 has storing portions 27 and guide portions 28. Each of the storing portions 27 holds the slider 19 retracted from the corresponding recording disk 17, the slider 19 having the magnetic heads for performing read and write operations on the recording disk 17. Each guide portion 28 makes it easy for the suspension arm 14 to move in and out of the storing portion 27 by sliding the lifting protrusion 15. The attaching portion 21 and the arm holding portion 22 are molded en bloc by a single injection molding operation, with high polymer material containing PTFE. The attaching portion 21 is configured by the screw hole 25 and a bracket 23 surrounding the screw hole 25. The arm holding portion 22 is constructed by the storing portions 27 and guide portions 28, which correspond to the upper and lower surfaces of the recording disks 17, and a support portion 24 which supports the storing portions 27 and guide portions 28 so that they are disposed in the direction in which the recording disks 17 are stacked. The storing portions 27 and the guide portions 28 are provided not only on the upper side of each disk of the recording disks 17 shown in FIG. 8A but also on the lower side and are formed symmetrically with respect to a plane X-Y dividing the disk horizontally into two parts. The circumferential edges of the recording disks 17 are partially inserted into openings 26. That is, each disk edge is interposed between the front edges 29 of the corresponding guide portions 28 without contacting any front edges. The ramp 20 is fixed to the housing 11 by the screw 31 so that the aforementioned positional relationship between the disk edges and the guide portions 28 is satisfied. If the actuator assembly 12 is retracted from the recording disk 17, the lifting protrusion 15 attached to the suspension arm 14 is lifted near the front edge 29 of the guide portion 28, slides against the guide portion 28, and is stored in the storing portion 27. On the other hand, if the actuator assembly 12 moves toward the recording disk 17 in the opposite direction, the lifting protrusion 15 moves out of the storing portion 27, slides against the guide portion 28, and moves over the disk surface from the front edge 29 of the guide portion 28.

In the case where the ramp 20 shown in FIG. 8A is fixed to the housing 11 of the information recording disk apparatus 10 by tightening the screw 31, stress will be accumulated near the screw hole 25 of the attaching portion 21. The stress deforms the peripheral portion with the passage of time and causes errors to occur in the dimension of each part of the ramp 20. That is, creep deformation will occur in the ramp 20 when it is fixed with the screw 31.

The portion where creep deformation becomes a problem particularly in the ramp 20 is the screw hole 25 and front edge 29 of the guide portion 28.

Since the tightening stress of the screw 31 is reduced in the screw hole 25 because of creep deformation, there will arise a problem that the ramp 20 in the information recording disk apparatus 10 loosens. In addition, the front edge 29 of the guide portion 28 needs to be installed so that it does not touch the recording disk and is not too away from the disk, in order to smoothly guide the suspension arm 14 (lifting protrusion 15), positioned over the disk being rotated at high speeds, to the storing portion 27 and, conversely, in order to smoothly guide the suspension arm 14 (lifting protrusion 15), stored in the storing portion 27, to the disk being rotated at high speeds. That is, the front edge 29 of the guide portion 28 needs to be positioned within a predetermined distance perpendicularly away from the recording disk. However, if creep deformation occurs near the screw hole 25 of the attaching portion 21, the front edge 29 of the guide portion 28 will be moved out of a predetermined distance perpendicularly away from the recording disk by the influence of creep deformation. As a result, there will arise a drawback that polymer particles occur, because the ramp 20 is easily contacted with the recording disk by external shock.

To eliminate the aforementioned drawbacks found in the ramp 20, a ramp reinforcing the screw hole 25 with a metal sleeve is known.

Illustrated in FIG. 8B is a ramp 20a reinforcing the screw hole 25 of the ramp 20 shown in FIG. 8A, with a metal sleeve 30.

The ramp 20a is molded with the metal sleeve 30 inserted into the screw hole 25. This can alleviate the stress accumulated near the screw hole 25 when tightening the screw. Therefore, the drawback that the ramp 20a in the information recording disk apparatus 10 loosens can be eliminated. In molding the ramp 20a, however, stress (thermal stress) resulting from a temperature difference during molding is accumulated near the metal sleeve 30 of the ramp 20a, because injection molding is performed under the condition that the metal sleeve 30 at normal temperature is placed in a metal mold managed in a predetermined high-temperature state. Particularly, when the temperature of the metal mold during molding rises to 80 to 90° C. near the upper limit of the operating temperature of the hard disk apparatus and then returns to room temperature, the thermal stress causes deformation to occur in the front edge 29 of the guide portion 28, as with the tightening stress of the screw. Furthermore, the metal sleeve 30 in the ramp 20a produces metal powder because it slides against the screw 31, when molding is performed with the metal sleeve 30 inserted in the screw hole 25 and when the ramp 20a is screwed to the housing 11. The occurrence of metal powder must be suppressed to the utmost, since there is a possibility that it will have an adverse effect on the magnetic heads, recording disks 17, etc., of the information recording disk apparatus 10. In addition, the great thermal expansion of resin around the metal sleeve 30 has influence on the guide portions 28. Therefore, applying the metal sleeve 30 to the ramp 20a is effective in order to alleviate the tightening stress of the screw, but is. unsuitable from the standpoint of the occurrence of thermal stress and the occurrence of thermal expansion and metal powder.

Next, as to the fact that the front edge 29 of the guide portion 28 is moved out of a predetermined distance perpendicularly away from the recording disk 17, a further description will be described with the drawings.

FIG. 9 illustrates the section of the ramp 20a and suspension arm 14 of FIG. 8B taken along line A—A of FIG. 7 in the direction of arrow Z. In FIG. 9, the ramp 20a has been fixed to the housing 11 of the information recording disk apparatus 10 by the screw 31. Also, three recording disks 17 (A, B, C) have been partially inserted into the ramp 20a without contacting the ramp 20a, and the suspension arms 14 have been retracted from the recording disks 17 to the guide portions 28. Note that in FIG. 9, there are spaces for a clear understanding of components; however, the lower surface of the bracket 23 and the lower surface of the support portion 24 are in intimate contact with the housing 11 and the ramp 20a is supported by the housing 11.

If the front edge 29 of the guide portion 28 is moved out of a predetermined distance perpendicularly away from the recording disk surface, there are cases where the gap distance ($L1_{up}$) between the upper surface of the recording disk and the slot of the ramp 20a (opening 26) becomes unequal to the gap distance ($L1_{down}$) between the lower disk surface and the slot. In the case where either $L1_{up}$ or $L1_{down}$ becomes extremely small, the recording disk is easily contacted with the ramp 20a by external shock during operation of the hard disk apparatus and therefore there is a possibility that reading and writing of information will be disturbed. Since the distances $L1_{up}$ and $L1_{down}$ become unequal, a great difference will occur between the loading and unloading positions over the recording disk which load and unload the sliders (magnetic heads) provided over the upper and lower disk surfaces. The recordable area on the recording disk is determined by the magnetic head in which the distance L2 is longer. That is, if the slider (magnetic head) loading and unloading positions over the recording disk are moved in the radially inner direction of the disk, the recordable area on the disk will diminish, and in the case of the same recording density, there will arise a disadvantage that the entire capacity is reduced. In addition, as an extreme example of the hard disk apparatus, there is a possibility that the data stored on the disk cannot be read out because of movement of the front edge 29 of the guide portion 28.

Notice that FIG. 9 illustrates both the lifting protrusion 15 supported by the guide portion 28 and the lifting protrusion 15 positioned over the disk, for a clear understanding of the present invention.

The drawback that the front edge 29 of the guide portion 28 is moved out of a predetermined distance perpendicularly away from the disk surface is prone to arise when the recording disk 17 is rotating at high speeds, i.e., when the inside of the information recording disk apparatus 10 is in a high-temperature state. This is because it is considered that the direction of deformation is changed by the influence of the aforementioned thermal stress or the tightening stress of the screw, when the front edge 29 of the guide portion 28 in the ramp 20a is deformed due to its thermal expansion during high rotation of the recording disk 17, since high polymer material has a thermal expansion coefficient several times ten to twenty times metal material.

The drawback that the front edge 29 of the guide portion 28 is moved out of a predetermined distance perpendicularly away from the disk surface 17 is more easily liable to occur as the number of the recording disks 17 to be stacked within the information recording disk apparatus 10 becomes greater. This is that the dimension of the ramp 20a becomes greater in the direction in which a plurality of recording disks are stacked, if the number of recording disks increases. For example, in the case where six front edges 29 in FIG. 9 are expressed as A1, A2, B1, B2, C1, and C2 in order from the upper side of the magnetic recording disk apparatus 10 to the lower side contacting the housing 11, the degree that the front edges 29 (A1, A2, B1, B2, C1, and C2) of the guide portions 28 are deformed due to their thermal expansion is increased, because the distance L3 between the front edge 29 (C2) of the guide portion 28 corresponding to the lower surface of the lowermost disk 17(C) and the front edge 29 (A1) of the guide portion 28 corresponding to the upper surface of the uppermost disk 17(A) increases.

FIG. 10 shows the degree that the front edge 29 of the guide portion 28 of the conventional ramp shown in FIGS. 8B and 9 is deformed because of temperature.

In FIG. 10, the degrees of deformation of the six front edges 29 (A1, A2, B1, B2, C1, and C2) in FIG. 9 were measured according to surrounding temperature changes.

As shown in FIG. 10, the degree of deformation of the front edge C1 is on the side of +, while the degree of deformation of the front edge B2 is slightly on the side of −. The front edge C1 in this case is deformed upward and the front edge B2 is deformed slightly downward. Therefore, the gap between the front edge C1 and the front edge B2 narrows with a rise in temperature, and it is understandable that the gap between the front edge B1 and the front edge A2 narrows similarly. Since these gaps diminish, in the worst case the adjacent suspension arms 14 between the front edges C1 and B2 or between the front edges B1 and A2 contact each other during movement and metal particles are produced within the hard disk apparatus. The occurrence of metal particles often destroys the data stored on the disk.

In FIG. 10, the gap between the front edge A1 and the front edge C2 is approximately 85 µm (difference ΔL due to deformation of distance L3 of FIG. 9) in case of 100° C. The value of this gap becomes greater if the number of recording disks 17 to be stacked within the information recording disk apparatus 10 is increased, so it becomes a graver problem.

SUMMARY OF THE INVENTION

Accordingly, it is an object of the present invention to provide a ramp in which deformation and loosening because of creep deformation do not occur and metal powder does not occur.

Another object of the invention is to provide a ramp which is capable of reducing the degree of deformation of the front edge of the guide portion caused in the direction in which recording disks are stacked.

In a ramp to store suspension arms which correspond to both sides of multiple double-sided recording disks, still another object of the invention is to provide a ramp where mechanical interference does not occur in adjacent suspension arms even when temperature rises, while reducing the degree of deformation of the front edge of the guide portion due to heat by only resin molding without employing a metal component such as a metal sleeve.

To attain the aforementioned objects, there is provided a ramp, which is used in an information recording disk apparatus having a suspension arm to hold a magnetic head for writing or reading information to or from a recording disk, for retracting the suspension arm from the recording disk and holding the suspension arm. The ramp comprises: a plurality of blocks with a connecting surface, each block being formed from a different high polymer material; and locking means in undercut form formed in each of the connecting surfaces. The blocks are connected mechanically and united in one by the locking means.

In the ramp for an information recording disk apparatus according to the present invention, the ramp is constructed by (1)an attaching portion molded with high polymer material, which is slight in creep deformation and small in thermal expansion coefficient, so that it is provided with a screw hole for fixing the ramp to a housing of the information recording disk apparatus by a screw and (2) an arm holding portion molded with high polymer material whose fiction coefficient is small, the arm holding portion having a storing portion to hold the suspension arm retracted from the recording disk and also having a guide portion against which the suspension arm slides so that it is easily moved in and out of the storing portion. The attaching portion and the arm holding portion are united in one by the locking means in undercut form.

In the ramp for an information recording disk apparatus according to the present invention, creep deformation occurs less in the high polymer material that is employed in the attaching portion than in the high polymer material that is employed in the arm holding portion. In addition, the thermal expansion coefficient of the high polymer material which is employed in the attaching portion is smaller than that of the high polymer material which is employed in the arm holding portion.

In the ramp for an information recording disk apparatus according to the present invention, the high polymer material that is employed in the attaching portion is selected from among polyetherimide (PEI), polyimide (PI), polycarbonate (PC), polyethersulphone (PES), polyphenylenesulfide (PPS), and high polymer material mixed with glass fibers or carbon fibers. In the ramp for an information recording disk apparatus according to the present invention, the high polymer material with a small friction coefficient, which is employed in the arm holding portion, is liquid crystal polymer (LCP) or contains polytetrafluoroethylene (PTFE).

In the ramp for an information recording disk apparatus according to the present invention, the high polymer material which is employed in the attaching portion and the high polymer material which is employed in the arm holding portion have the same temperature range in a temperature condition required of a metal mold for molding both materials.

In accordance with the present invention, there is provided a method of manufacturing a ramp that retracts a suspension arm, which holds a magnetic head for writing or reading information to or from a recording disk, from the recording disk and holds the suspension arm. The method comprises the steps of: designing the ramp so that it is constructed by a plurality of blocks; molding the blocks subsequently with different high polymer materials; molding an undercut in a connecting surface of the first molded block which contacts the second molded block; and causing the undercut to function as part of a metal mold in molding the second molded block. According to this manufacturing method, the blocks that are molded with different high polymer materials are united in one.

In the ramp for an information recording disk apparatus according to the present invention, the temperature of the metal mold is higher than 90° C. which is higher than the highest temperature that a hard disk apparatus reaches when it is installed or in use. At temperatures less than this, the distortion or stress, stored in the inside of the ramp, is difficult to release. Therefore, ramps molded at temperatures less than 90° C. can be easily discriminated, because ramp deformation is conspicuous if the ramps are raised to 90° C.

In the ramp manufacturing method according to the present invention, the metal mold for molding a plurality of blocks molds one block at a first molding position, then rotates along with the molded block to a second molding position and molds another block. According to the present invention, there is provided an information recording disk apparatus comprising: a rotary actuator assembly having a suspension arm connected thereto; a plurality of magnetic disks stacked; a ramp, disposed near the magnetic disks, for retracting the suspension arm; and a housing to house the actuator assembly, the magnetic disks, and the ramp. The ramp as set forth in any one of claims 1 to 12 is fixed on the housing by an attaching screw.

BRIEF DESCRIPTION OF THE DRAWINGS

FIG. 2A is a perspective view showing the ramp of the one embodiment of the present invention viewed from the side of the attaching portion;

FIG. 2B is a perspective view showing the ramp of FIG. 2A viewed from the side of the arm holding portion;

FIG. 2C is a sectional view taken along a line C—C of FIG. 2A;

DETAILED DESCRIPTION OF THE PREFERRED EMBODIMENT

The present invention will hereinafter be described based on an embodiment in which the present invention is illustrated.

Figure 1:
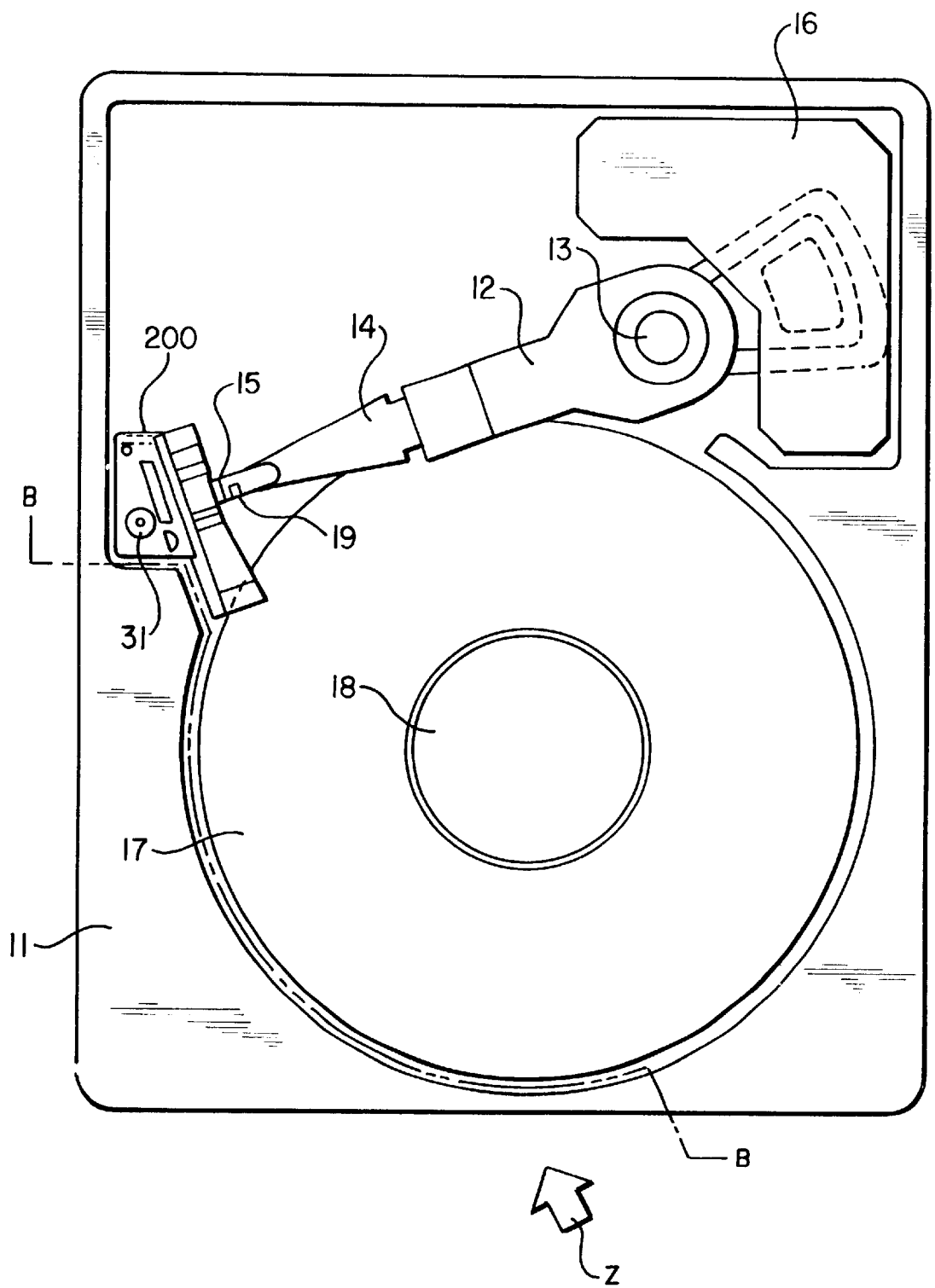
FIG. 1 is a plan view showing a magnetic recording disk apparatus provided with a ramp of one embodiment of the present invention.
Figure 7:
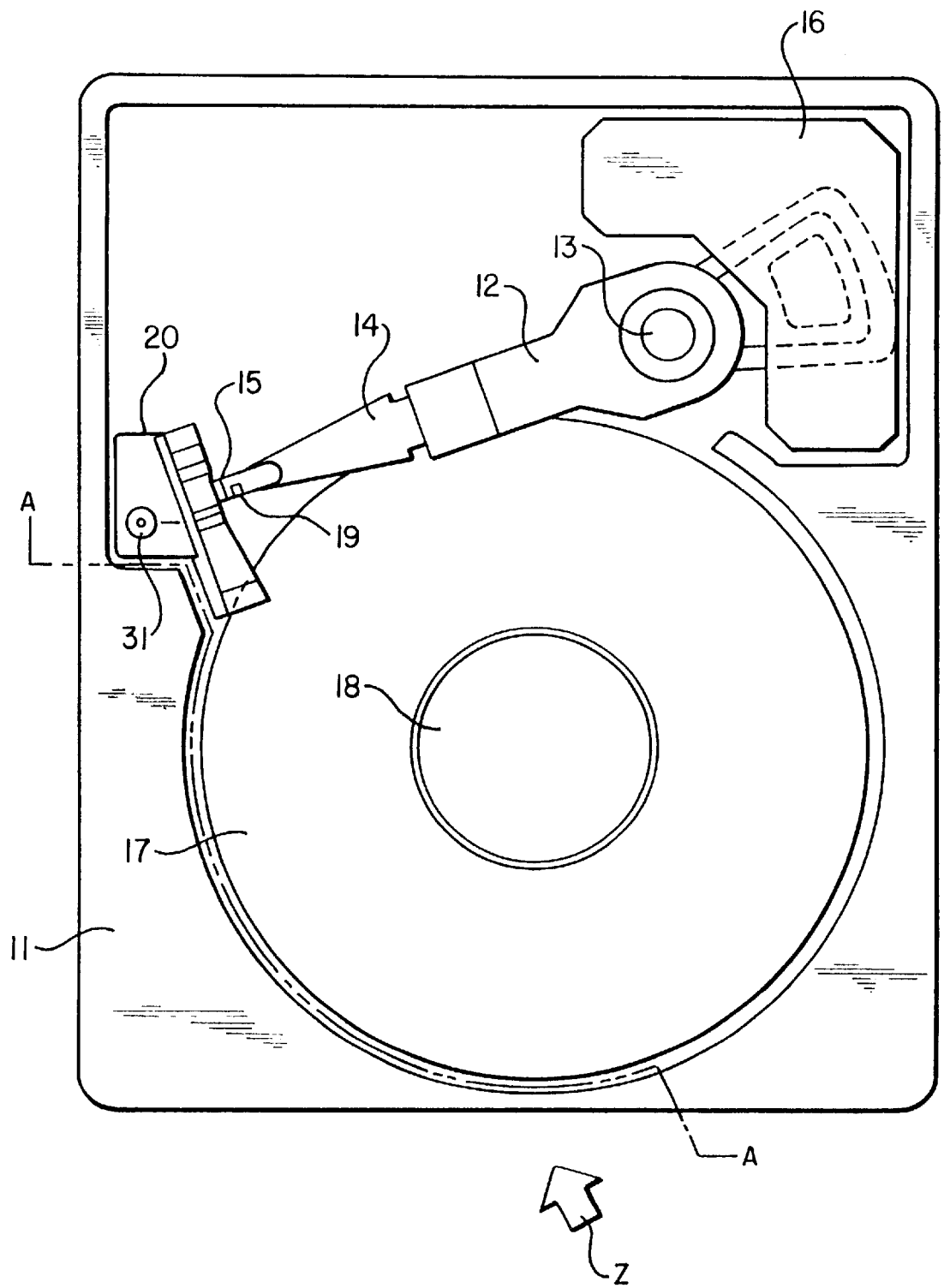
FIG. 7 is a plan view of a conventional magnetic recording disk apparatus employing a ramp.

FIG. 1 is a plan view showing a magnetic recording disk apparatus provided with a ramp according to one embodiment of the present invention. Note that in FIG. 1, the same reference numerals are applied to the same functional parts as the conventional information recording disk apparatus 10 shown in FIG. 7, for avoiding redundancy.

The magnetic recording disk apparatus 100 of the embodiment of FIG. 1 houses a recording disk 17, a rotary actuator assembly 12, a voice coil motor 16, and a ramp 200 in a housing 11 and forms an airtight space in the inside of the housing 11. The construction and function of the housing 11, actuator assembly 12, pivot shaft 13, suspension arm 14, lifting protrusion 15, voice coil motor 16, recording disk 17, slider 19, and screw 31 in the magnetic recording disk apparatus 100 shown in FIG. 1 are the same as the conventional information recording disk apparatus 10 shown in FIG. 7, and only the configuration and function of the ramp 200 differ.

FIG. 2A is a perspective view showing the ramp of the embodiment of the present invention viewed from the side of an attaching portion, FIG. 2B is a perspective view showing the ramp of FIG. 2A viewed from the side of an arm holding portion, and FIG. 2C shows a sectional view taken along line C—C of FIG. 2A. Note that the ramp of the embodiment shown in FIGS. 2A and 2B is of a type that holds each suspension arm in the case where three double-sided recording disks are stacked.

As illustrated in FIGS. 2A and 2B, the ramp 200 of this embodiment is designed so that an attaching portion 221 and an arm holding portion 222 are combined and constructed. The attaching portion 221 is a block having a screw hole 25 for fixing the ramp 200 to the housing 11 of the information recording disk apparatus 100 by using the screw 31. The arm holding portion 222 is a block that has both storing portions 27 and guide portions 28. The storing portions 27 hold the sliders 19 retracted from the recording disks 17, the sliders 19 having magnetic heads for performing read and write operations on the recording disks 17. The guide portions 28 make it easy for the suspension arms 14 to enter and leave the storing portions 27 by sliding the lifting protrusion 15. Note that in FIGS. 2A and 2B, the attaching portion 221 and the arm holding portion 222 are separated from each other for the convenience of explanation; however, they cannot be separated because, as described below, protruding portions and recesses (locking means) in undercut form are formed in the connecting surfaces of the attaching portion 221 and the arm holding portion 222 so that the protruding portions are fitted into the recesses.

Figure 8A:
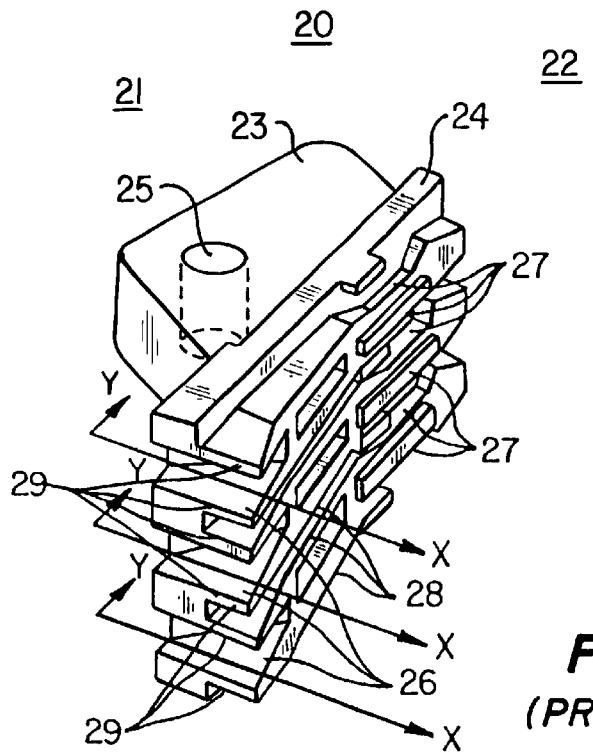
FIG. 8A is a perspective view showing a conventional ramp where all parts are molded by employing high polymer material containing polytetrafluoroethylene (PTFE)
Figure 8B:
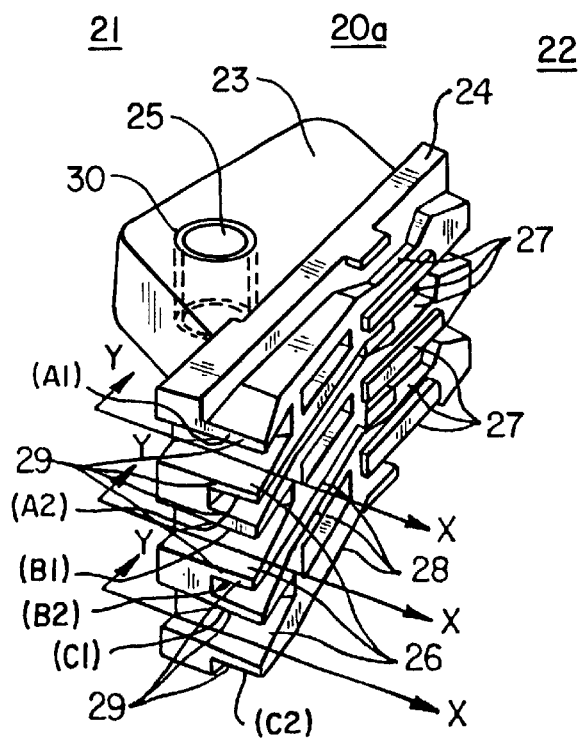
FIG. 8B is a perspective view showing another conventional ramp of FIG. 8A reinforcing a screw hole with a metal sleeve.

In addition, the attaching portion 221 and arm holding portion 222 of the ramp 200 of this embodiment are molded from different polymer materials, unlike the. conventional ramp 20 and ramp 20a, mass molded, illustrated in FIGS. 8A and 8B.

Material, in which the thermal expansion coefficient is small and creep deformation is slight, is selected as the high polymer material for molding the attaching portion 221. For example, polyetherimide (PEI), polyimide (PI), polycarbonate (PC), polyethersulphone (PES), and polyphenylenesulfide (PPS) are suitable. In addition, even polymer materials other than the aforementioned, for example, polymer materials, reinforced with glass fibers or carbon fibers, have a small thermal expansion coefficient and slight creep deformation, compared with polymer materials not reinforced. Therefore, polymer materials reinforced with glass or carbon fibers can also be selected. In this embodiment, PEI is selected and the attaching portion 221 is molded with Ultem 1000 (trademark of GE Plastic).

High polymer materials for molding the arm holding portion 222 require that the stretch in the longitudinal direction of the guide portion 28 be suppressed, their friction coefficient be small, and their wear resistance be good. For this reason, liquid crystal polymer (LCP) was selected and VECTRA A430 (trade name) made by Hoechst-Celanese, Inc. was employed. VECTRA A430 is copolymer ether consisting of a 4-hydroxybenzoic acid and a 6-hydroxy-2-naphthoic acid (HAHN). HAHN has a small friction coefficient and excellent wear resistance. HAHN also has highly anisotropic thermal expansion coefficients and therefore has two thermal expansion coefficients. Note that the LCP in this embodiment is mixed with polytetrafluoroethylene (PTFE) in order to reduce the friction coefficient of the guide portion 28.

The thermal expansion coefficients of plastic materials used in the ramp are listed in Table 1.

TABLE 1

| Materials | Thermal expansion coefficients (' $10^{-6}$/degree) |
| --- | --- |
| HAHN (VECTRA A430) | −2 to 5 (vertical direction) or 65 to 80 (horizontal direction) |

TABLE 1-continued

| Materials | Thermal expansion coefficients (' $10^{-6}$/degree) |
| --- | --- |
| Polyacetal | 75 to 85 |
| Polyetheretherketon (PEEK) | 40 to 50 |
| Polyimide (Ultem 1000) | 31 to 50 |
| Polyetherimide | 40 to 50 |

In general, LCP and PEI are less liable to fuse into one, and there is a little possibility that both materials will fuse at the connecting surface therebetween, even if they are molded by employing an ordinary two-color molding method. Furthermore, since LCP in this embodiment is mixed with PTFE and this mixing disturbs fusion between LCP and PEI, the connecting surface between LCP and PEI will not fuse at all, even if they are molded by employing an ordinary two-color molding method.

Hence, in this embodiment, recesses 251, 252 and recesses 253, 254 in undercut form, which are locking means, are provided in the connecting surface of the attaching portion 221 that contacts the arm holding portion 222. Also, protruding portions 241, 242 and protruding portions 243, 244 in undercut form are provided in the connecting surface of the arm holding portion 222 that contacts the attaching portion 221. The words "undercut form" mean part of a molding that cannot be separated from a metal mold, unless the molding is deformed or a special metal mold structure is employed, when the molding is removed from the metal mold, or mean a cutout in such a molding. The words "special metal mold structure" mean, for example, a metal mold structure having a loose core to be fitted into the metal mold, a slide core or slide pin, which slides in the inside of the metal mold when opening or closing the metal mold, etc. That is, the undercut form is a form that has a portion projecting sidewise with respect to a metal-mold removing direction so that it cannot be molded by an ordinary metal mold.

The recess 251 can be molded by a metal mold which is removed in the removing direction −X shown in FIGS. 2A and 2C, and the recess 252 is continues to the recess 251, is positioned behind the recess 251 in the removing direction, and projects in the directions Y and Z perpendicular to the removing direction −X.

That is, for dimensions in the Y and Z directions perpendicular to the removing direction −X, the recess 252 is greater than the recess 251.

Similarly, the recess 253 can be molded by a metal mold which is removed in the removing direction −X, and the recess 254 is continues to the recess 253, is positioned behind the recess 253 in the removing direction, and projects in the directions Y and Z perpendicular to the removing direction −X.

That is, with respect to dimensions in the Y and Z directions perpendicular to the removing direction −X, the recess 254 is greater than the recess 253.

The recesses 251, 252 are the recess 251 which can be molded by a metal mold which is removed in the removing direction and the recess 252 which projects perpendicularly to the direction of removing the recess 251. Therefore, between the recesses 251 and 252, the recess 252 is greater with respect to the dimensions in the directions Y, Z perpendicular to the direction −X of removing the recess 251 (in FIGS. 2A and 2C). In other words, in the case of the recesses 251, 252, the outer circumferential dimension of the recess 252 is greater than that of the recess 251. In the case of the recesses 253, 254, the outer circumferential dimension of the recess 254 is greater than that of the recess 253, as with the case of the recesses 251, 252.

The method of molding recesses in undercut form will be described later with FIGS. 3 and 4.

On the other hand, in the case of the protruding portions 241, 242 in undercut form that are provided in the connecting surface of the arm holding portion 222 which contacts the attaching portion 221, the outer circumferential dimension of the protruding portion 242 is greater than that of the protruding portion 241. This is because the recesses 251, 252 in undercut form, which are provided in the connecting surface of the attaching portion 221 which contacts the arm holding portion 222, function as part of a metal mold in molding the protruding portions 241, 242 in undercut form and because the high polymer material for the attaching portion 221 enters the recesses 251, 252 and are molded. In the case of the recesses 243, 244, the outer circumferential dimension of the protruding portion 244 is greater than that of the protruding portion 243. This, as with the case of the protruding portions 241, 242, is that high polymer material enters the recesses 253, 254, which are provided in the connecting surface of the attaching portion 221 that contacts the arm holding portion 222, and is molded. Recesses 255, 256 are formed for ensuring passages into which the high polymer material for the arm holding portion 222 is extruded during molding, and have no relation with a connection with the arm holding portion 222 on the side of the attaching portion 221. Therefore, for a protruding portion 245 and a protruding portion 246, a portion that functions as a passage in extruding high polymer material for the arm holding portion 222 is cooled and formed.

The high polymer material PEI for the attaching portion 221 and high polymer material LCP for the arm holding portion 222 in this embodiment are moldable at the same metal-mold temperature. This is for the purpose of not giving residual stress to the. attaching portion 221 and the arm holding portion 222 during molding. In addition, the portions 221, 222 are selected so that they have the metal-mold temperature range in the temperature condition required of the metal mold when molding them, whereby the molding portions for the attaching portion 221 and the arm holding portion 222 can be provided in a single metal mold.

In the molding method of this embodiment, the attaching portion 221 is first molded by employing high polymer material, such as a PEI, which has a small thermal expansion coefficient and slight creep deformation. Subsequently, the arm holding portion 222 is molded by employing high polymer material, such as a LCP containing a PTFE, which has a small amount of longitudinal stretch and a small friction coefficient.

Figure 3:
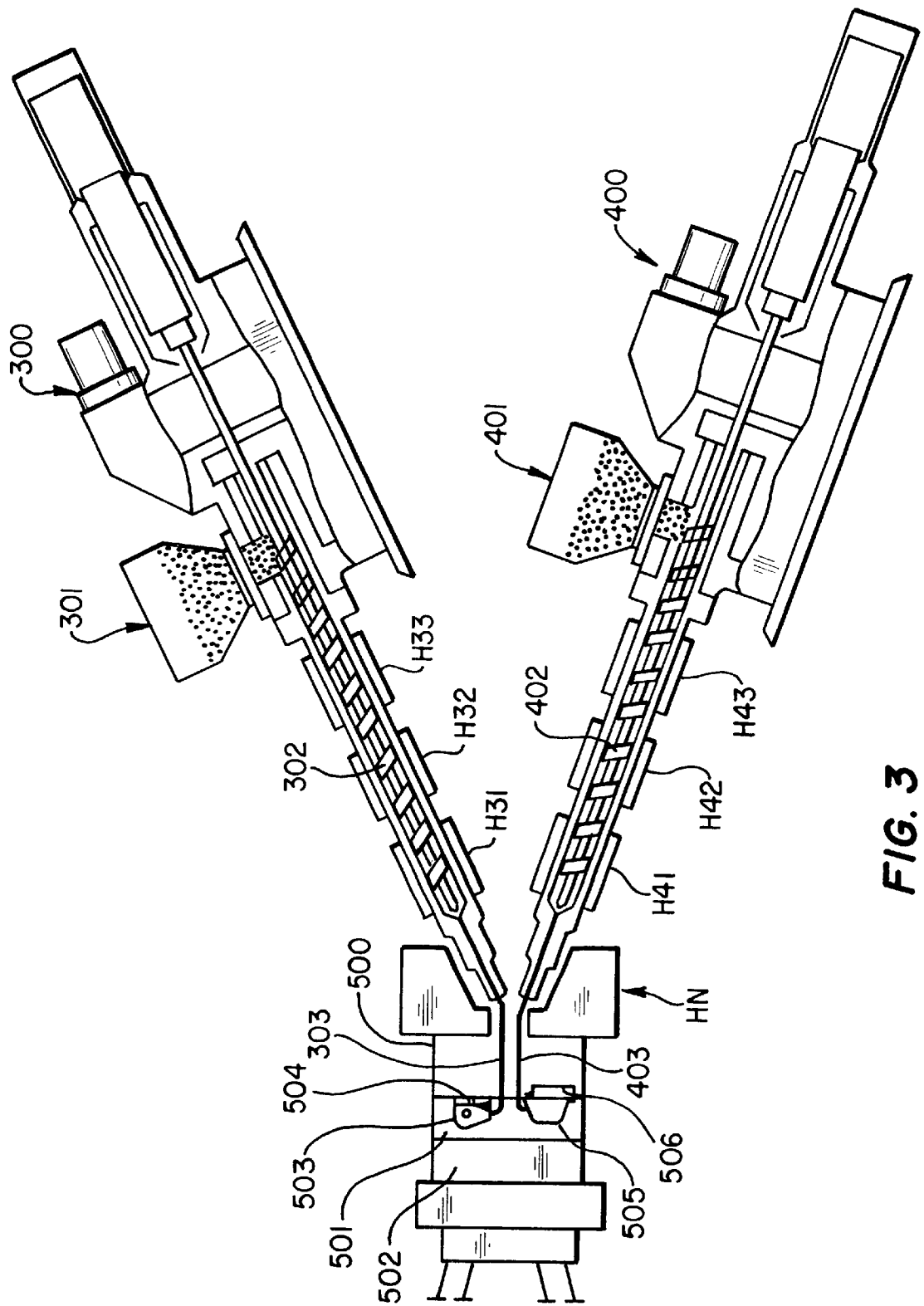
FIG. 3 is a schematic diagram showing a molding unit for molding the ramp of this embodiment.

FIG. 3 schematically illustrates a molding unit that molds the ramp 200 according to this embodiment.

In this embodiment, two kinds of high polymer materials are employed as described above and two-stage injection molding is performed successively by rotating one of the two metal molds that move toward and away from each other. In this manner, the ramp 200 is molded.

In a first extruding device 300, PEI is put into a hopper 301 and is extruded into a metal mold 500 and a rotary metal mold 501 by a screw portion 302. At the same time, in a second extruding device 400, LCP containing PTFE is put into a hopper 401 and LCP is extruded into the metal mold 500 and the rotary metal mold 501 by a screw portion 402.

During molding, the screw portions 302 and 402 is maintained at constant temperatures by electric heaters H31 to H33, H41 to H43, and HN. For example, the screw portion 402 is maintained at 280° C. by the electric heater H41 on the side of the arm holding portion 222 (A430), at 270° C. by the electric heater H42, at 260° C. by the electric heater H43, and at 275° C. by the electric heater HN. In addition, the metal mold 500 and the rotary metal mold 501 are maintained at 130° C. The pressure of the high polymer material to be injected into the metal mold 500 and the rotary metal mold 501 by the first and second extruding devices 300, 400 is set to 0.345 Pa (352 kg/cm$^2$), and PEI and LCP are held within the metal molds for 20 sec after they have been injected into the metal molds. The inside of the metal mold 500 and rotary metal mold 501 will be described with FIG. 4.

Figure 4A:
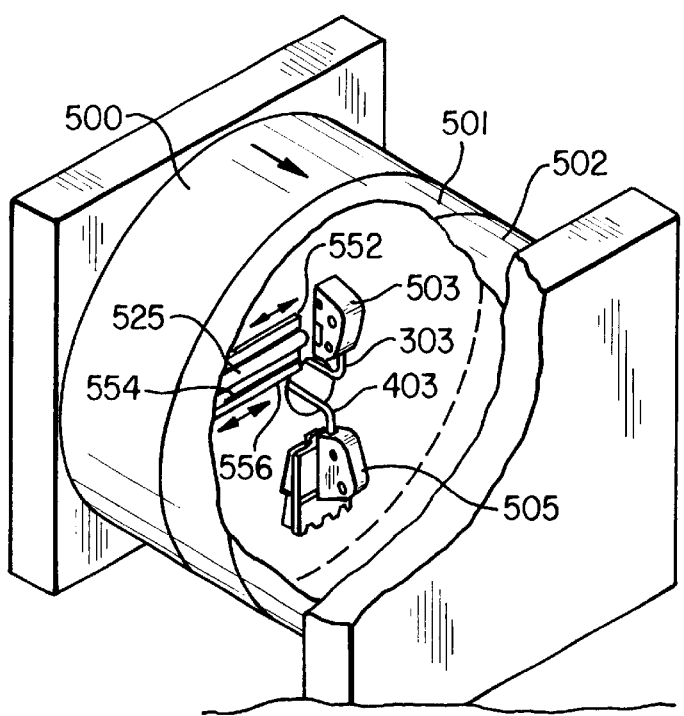
FIGS. 4A and 4B are enlarged perspective views, partly cut away, showing the metal mold and the rotary metal mold of FIG. 3.
Figure 4B:
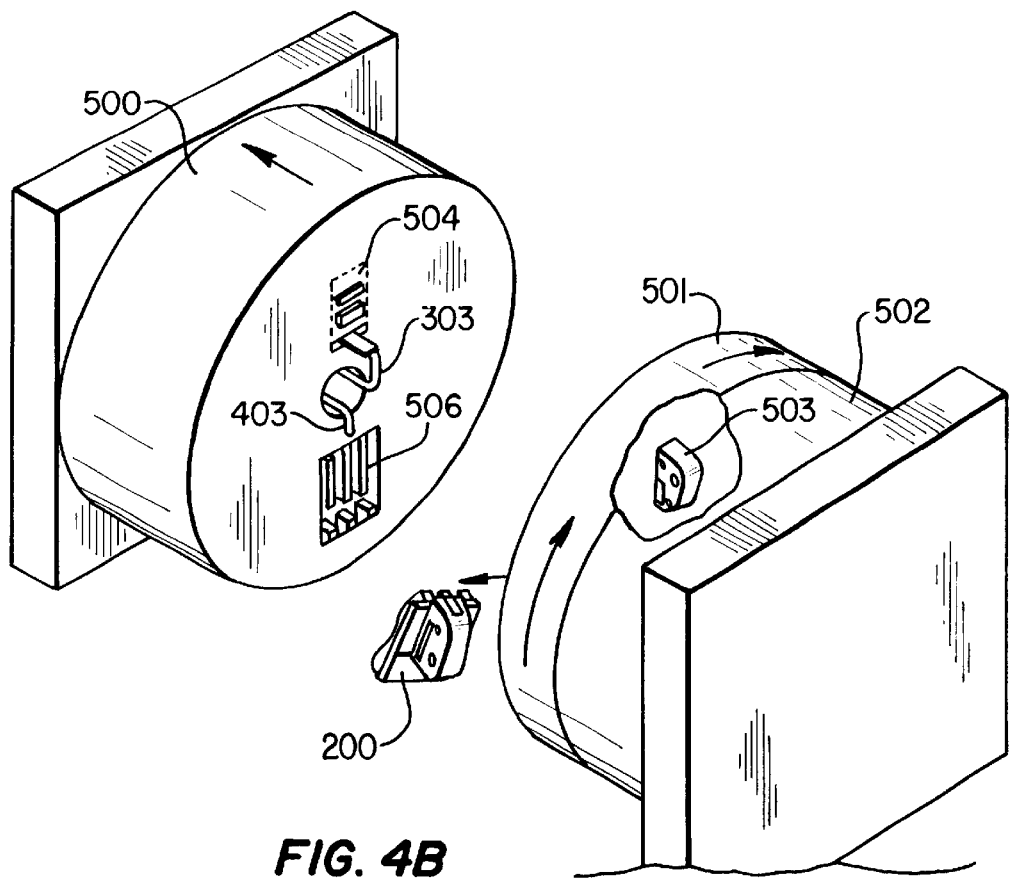

FIGS. 4A and 4B are enlarged perspective views showing the metal mold 500 and the rotary metal mold 501 of FIG. 3 with a portion of the rotary metal mold 501 cut away.

In FIG. 4A, the metal mold 500 is pressed against the rotary metal mold 501, and the slide portions 525, 552, 554, and 556 are inserted into a molding portion 503 within the rotary metal mold 501. If the slide portions 525, 552, 554, and 556 are inserted, high polymer materials are extruded from extruding nozzles 303 and 403 into the metal mold 500 and the rotary metal mold 501. With the slide portions 525, 552, 554, and 556, the recesses 252 and 254 in undercut form, which are provided in the connecting surface of the attaching portion 221 that contacts the arm holding portion 222, are formed and the screw hole 25 is formed. Also, the recesses 251 and 253 in undercut form are formed by the molding portion 504 of the metal mold 500 shown in FIG. 4B. In this way, the attaching portion 221 is formed. On the other hand, in the molding portion 505 of the rotary metal mold 501, the arm holding portion 222 is successively molded by employing the molding portion 506 of the metal mold 500 (two-stage molding), with respect to the formed attaching portion 221. Thus, the ramp 200 is formed by two-stage molding.

If the high polymer materials are cooled within the metal molds, the slide portions 525, 552, 554, and 556 inserted in the molding portion 503 of the rotary metal mold 501 are returned to the saving positions, and the metal mold 500 is separated from the rotary metal mold 501.

In FIG. 4B, the metal mold 500 has been separated from the rotary metal mold 501 and the molded ramp 200 has been pushed out by a push-out pin (not shown) or the like. After the ramp 200 has been pushed out, the rotary metal mold 501 rotates through 180 degrees so that the molding portion 503 present at a position facing the molding portion 504 of the metal mold 500 is moved to a position facing the molding portion 506 of the metal mold 500. When this occurs, the attaching portion 221 formed within the molding portion 503 also moves along with the molding portion 503.

In this embodiment, in this way, the recesses 252 and 254 in undercut form are formed in the connecting surface of the attaching portion 221 which contacts the arm holding portion 222, and the arm holding portion 222 is subsequently formed. This mechanically firmly locks the high polymer material PEI for the attaching portion 221 and the high polymer material LCP for the arm holding portion 222 which are difficult to connect by an ordinary method. In addition, by successively molding the attaching portion 221 and the arm holding portion 222 by the rotary metal mold 501 with different kinds of high polymer materials moldable at the same metal-mold temperature, there is no possibility that the manufacturing efficiency will be reduced, because the tact time, which is the time between manufacture of one ramp and manufacture of another ramp when manufacturing the ramp 200 in the manufacturing step, does not increase, although the number of steps for manufacturing a single ramp 200 increases. In addition, in the ramp 200 of this embodiment, the temperature of the metal molds is higher than 90° C. which is higher than the highest temperature that a hard disk apparatus reaches when it is installed or in use, and the high polymer materials to be employed include the aforementioned temperature in the temperature condition. Therefore, distortion or stress, stored in the inside of the ramp, is difficult to release at temperatures equal to or less than the temperature which is higher than 90° C. By selecting high polymer materials and setting the temperature of the metal molds, in this manner, ramps molded at temperatures less than 90° C. can be easily discriminated, because ramp deformation becomes conspicuous if the ramps are raised to 90° C.

A description will be given of the degree to which the front edge of the guide portion of the ramp 200 of this embodiment molded in the aforementioned manner is deformed due to temperatures.

The connecting portion of the ramp 200 shown in FIG. 2 differs from those of the conventional ramp 20 and ramp 20a shown in FIGS. 8A and 8B, because the attaching portion 221 and the arm holding portion 222 are molded with different high polymer materials. However, the dimensions of each part of the ramp 200 are the same as the conventional ramps 20 and 20a. The arm holding portion 222, therefore, has a support portion 24, openings 26, storing portions 27, and guide portions 28, as with the conventional ramps 20 and 20a. In addition, as with the conventional ramps 20 and 20a, the guide portion 28 has a front edge 29 and the attaching portion 221 also has a screw hole 25 and a bracket 23 surrounding the screw hole 25. Furthermore, the ramp 200 is fixed to the housing 11 of the information recording disk apparatus 10 by the screw 31 similarly as in the conventional ramps 20 and 20a.

Figure 5:
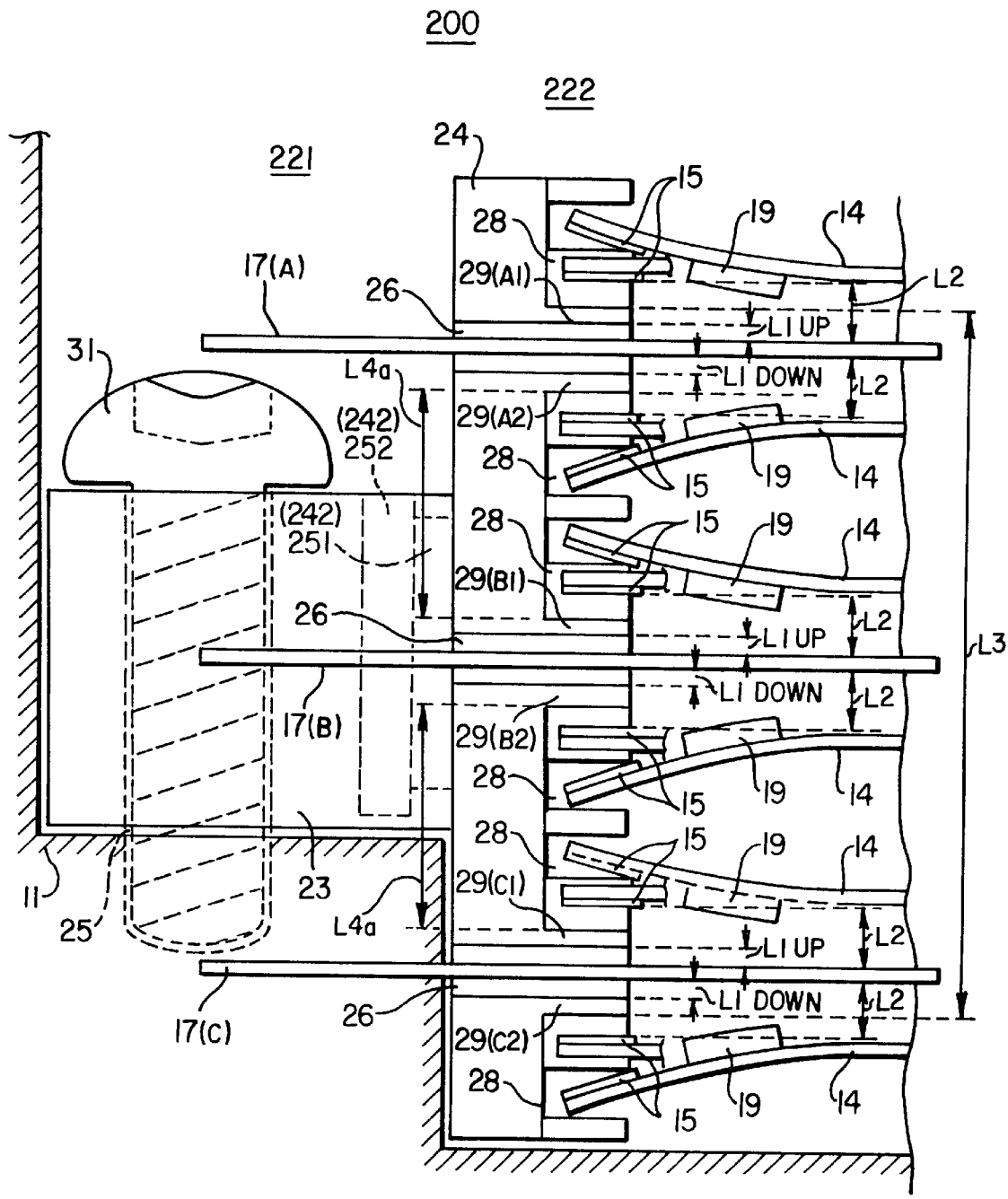
FIG. 5 is a sectional view showing the ramp and the suspension arms of FIG. 2 taken along a line B—B of FIG. 1 in the direction of arrow Z.

FIG. 5 shows a sectional view taken along line B—B of FIG. 1 in the direction of arrow Z. In the figure, the ramp 200 has been fixed to the housing 11 of the information recording disk apparatus 100 by the screw 31. Also, three recording disks 17 (A, B, C) have been partially inserted into the ramp 200 without contacting the ramp 200, and the suspension arms 14 have been retracted from the recording disks 17 to the guide portions 28.

Figure 9:
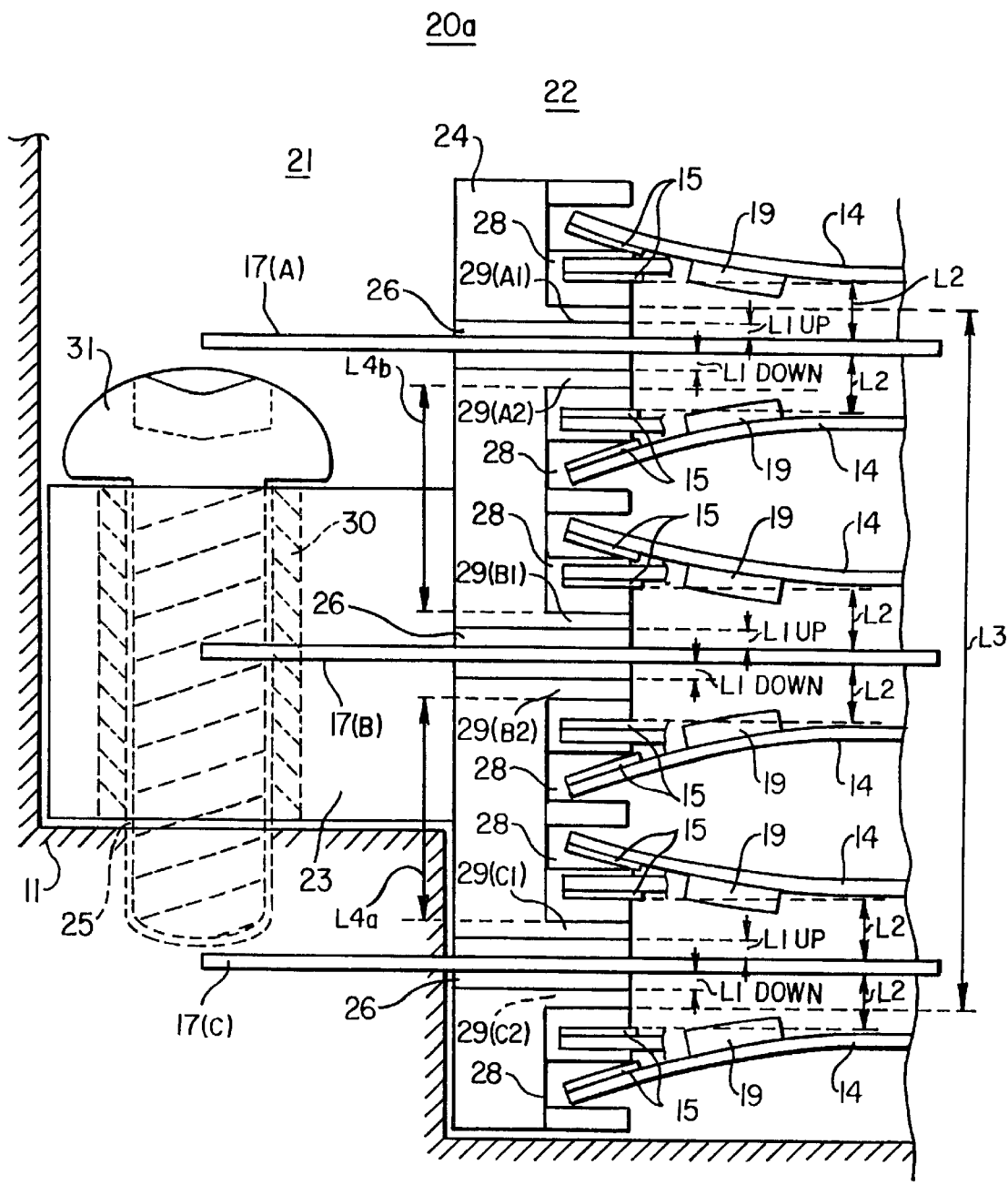
FIG. 9 is a sectional view showing the ramp and the suspension arm of FIG. 8B taken along a line A—A of FIG. 7 in the direction of arrow Z.

The difference between the ramp 200 of this embodiment shown in FIG. 5 and the conventional ramp 20a shown in FIG. 9 is that in the ramp 200, the high polymer material constituting the attaching portion 221 differs from that of the arm holding portion 222 instead of not having the metal sleeve 30. As different high polymer materials are connected, the ramp 200 further differs from the conventional ramp 20a in that: recesses 251, 252 in undercut form, etc., are provided in the surface of the attaching portion 221 which contacts the arm holding portion 222; and protruding portions 241, 242, etc., are provided in the arm holding portion 222. The other points are the same as the conventional ramp 20a shown in FIG. 9.

In the case where the ramp 200 shown in FIG. 5 is fixed to the housing 11 of the information recording disk apparatus 10 by the screw 31, stress near the screw hole 25 in the attaching portion 221 is accumulated by tightening the screw 31. However, a reduction in the tightening stress of the screw because of creep deformation in the screw hole 25 is slight, since the high polymer material PEI constituting the attaching portion 221 is small in thermal expansion coefficient and slight in creep deformation, compared with the high polymer material LCP constituting the arm holding portion 222. In this embodiment, therefore, there is no possibility that the ramp 200 in the information recording disk apparatus 100 will loosen.

In addition, in the ramp 200, a reduction in the tightening stress of the screw 31 is slight as described above and internal stress is considerably slight because no metal sleeve is employed. As a result, the degree of deformation of the front edge 29 of the guide portion 28 also diminishes.

In the temperature cycle test from room temperature to 100° C., executed by the inventor, the ramp 200 with a screw 31 being tightened by a torque of 0.127 J (1.3 kgf×cm) was loosened by a torque (torque necessary for loosening a screw) of 0.096 J (0.98 kgf×cm). This is nearly equal to the loosening torque 0.093 J (0.95 kgf×cm) in the case of the temperature cycle test made on the conventional ramp 20a employing the metal sleeve and is a satisfactory value. For reference, in the temperature cycle test made on the conventional ramp 20 molded with LCP alone, the loosening torque was 0.035 J (0.36 kgf×cm). From this it follows that the conventional ramp 20 has considerably loosened, compared with the ramp 20a using the metal sleeve and the ramp 200 of this embodiment.

Figure 6:
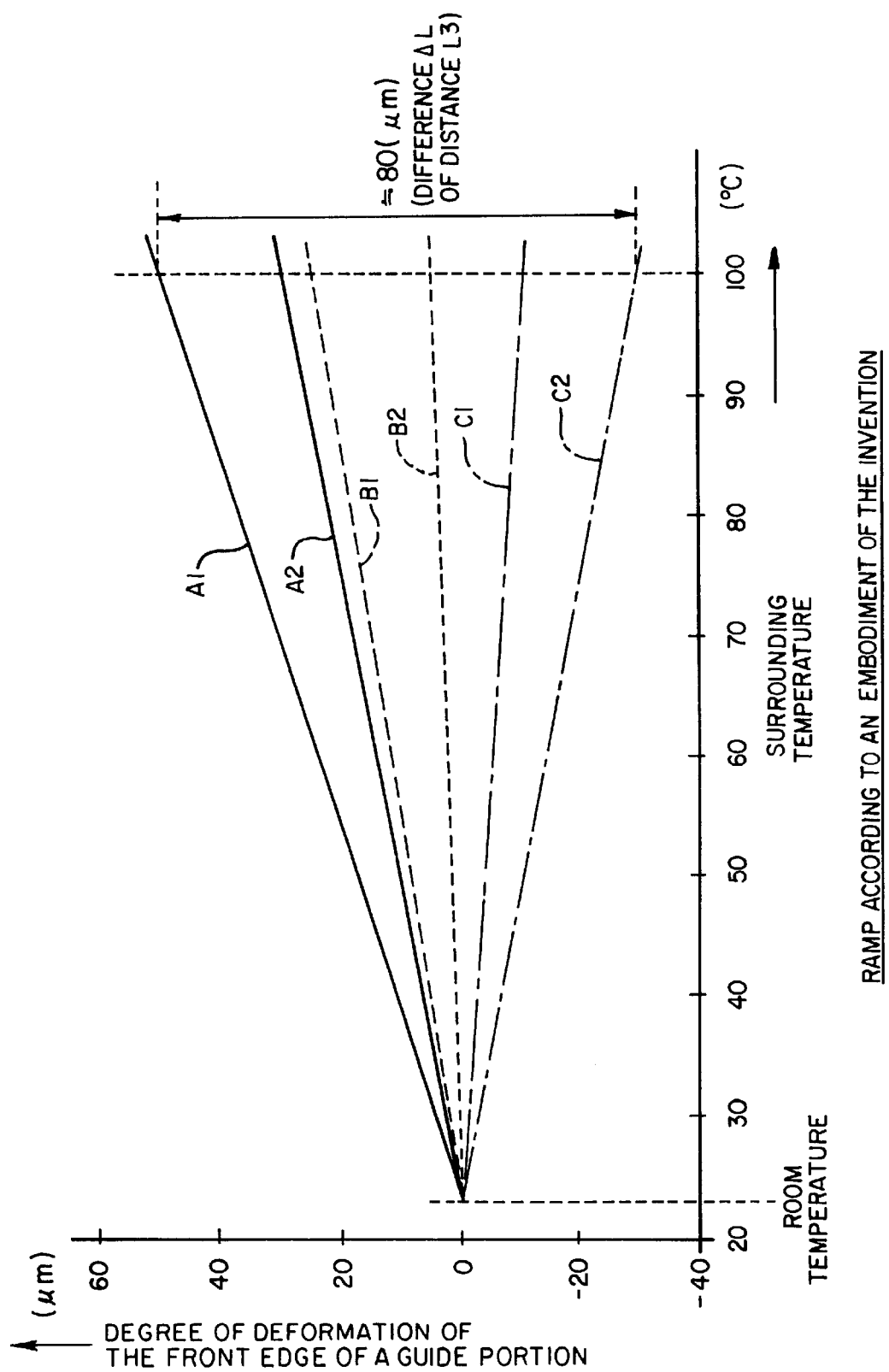
FIG. 6 is a graph showing the degree that the front edge of the guide portion of the ramp of this embodiment shown in FIG. 5 is deformed due to temperature.

FIG. 6 shows the degree to which the front edge 29 of the guide portion 28 of the ramp 200 of this embodiment shown in FIG. 5 is deformed due to temperature.

Figure 10:
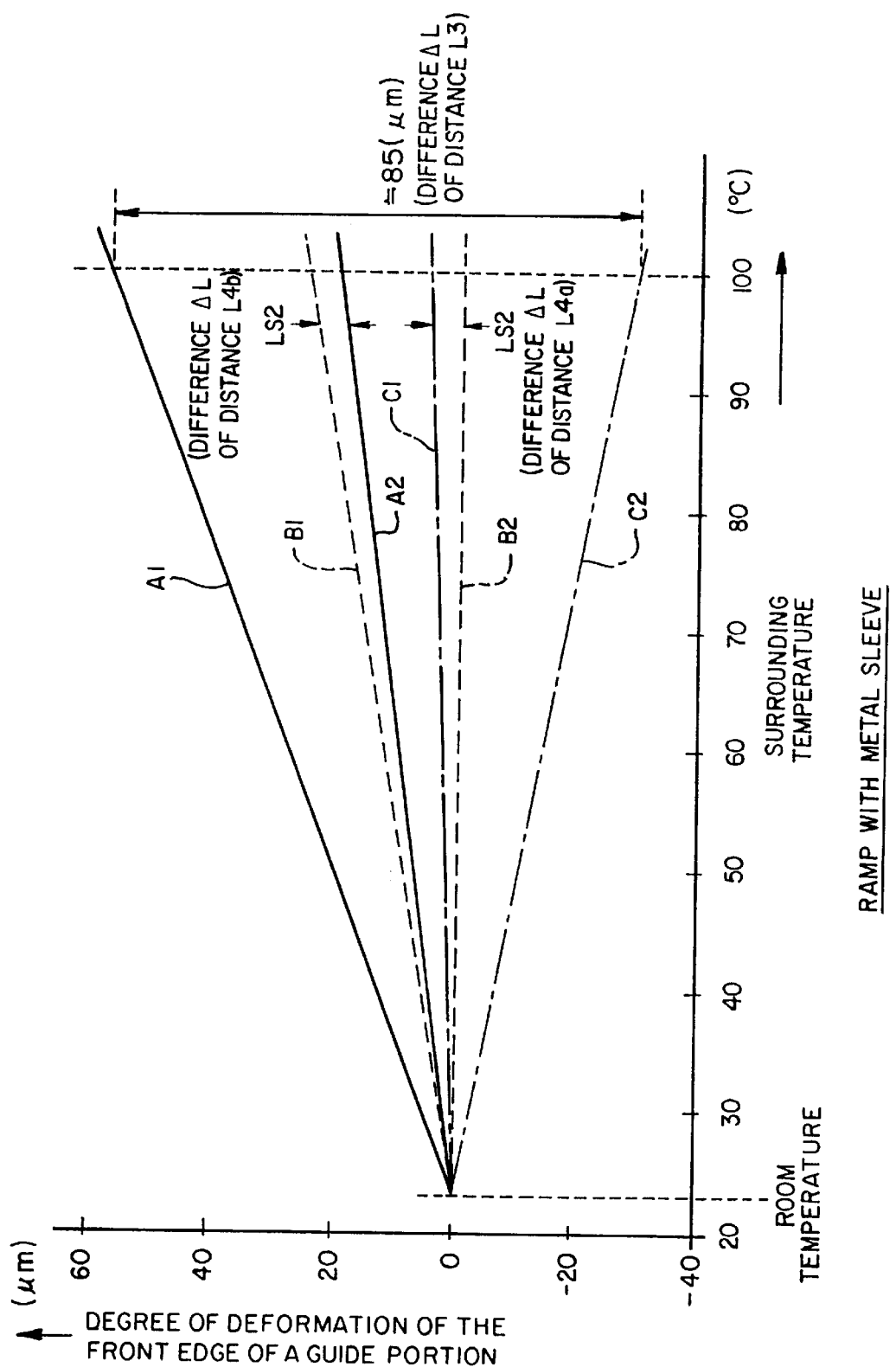
FIG. 10 is a diagram showing the degree that the front edge of the guide portion of the conventional ramp shown in FIGS. 8B and 9 is deformed because of temperature.

In FIG. 6, as with FIG. 10 showing measurements made on the conventional ramp 20a, the degrees of deformation of the six front edges 29 (A1, A2, B1, B2, C1, and C2) in FIG. 5 were measured according to temperature changes.

The essential difference between the ramp 200 shown in FIG. 6 and the ramp 20a shown in FIG. 10 is that FIG. 6 do not indicate the phenomenon that the value, obtained by subtracting the degree of deformation of the front edge C1 from the degree of deformation of the front edge B2, is negative (found in the conventional ramp 20a), i.e., the phenomenon that the front edge B2 and the front edge C1 approach each other. Similarly, the front edge A2 and the front edge B1 do not approach each other. In the ramp 200 shown in FIG. 6, the difference in degree of deformation between the front edge A1 and the front edge A2, the difference in degree of deformation between the front edge B1 and the front edge B2, and the difference in degree of deformation between the front edge C1 and the front edge C2 are all reduced, compared with the conventional ramp 20a shown in FIG. 10. The ramp 200 of this embodiment, therefore, is capable of reducing the danger that adjacent suspension arms 14 will contact each other.

Furthermore, in FIG. 6, the gap (difference ΔL due to deformation of distance L3 of FIG. 5) between the front edge A1 and the front edge C2 is approximately 80 μm in the case of 100° C. and less than the case of the conventional ramp 20a shown in FIG. 10 (approximately 85 μm).

From the foregoing description it is found that the ramp of this embodiment is capable of reducing creep deformation in the front edge 29 of the guide portion 28 and the entire thermal expansion, if the temperature cycle test is made.

Therefore, the ramp 200 of this embodiment can reduce the drawback that adjacent suspension arms 14 contact during movement and produce metal particles, because the thermal expansion coefficient in the direction of stacking disks is smaller than that of the conventional ramp 20a, and the possibility of a reduction in the gap between the front edges A2 and B1 and between B2 and C1 is reduced.

In the case where the thick wall portion of the attaching portion 221 is molded with LCP constituting the arm holding portion 222, as in the conventional ramp 20 or 20a, there is a drawback that a "sink" which is a depression is liable to occur in the surface of the thick wall portion, when the molding is cooled to room temperature. For this reason, when the thick wall portion of the attaching portion 221 is molded with LCP, there is a need to thin wall thickness by cutting out the central portion of the thick wall portion of the attaching portion 221. However, the "sink" is less liable to occur, because the high polymer material PEI constituting the attaching portion 221 of this embodiment is small in thermal expansion coefficient and slight in creep deformation, compared with LCP constituting the arm holding portion 222. In addition, since the attaching portion 221 has an undercut into which the arm holding portion 222 is fitted, the attaching portion 221 can be molded without the "sink", even if there is no irregularities in the exterior of the attaching portion 221. As a result, drying of a washing solution in a washing process, which is required when the components of the hard disk apparatus are molded and assembled, is satisfactory and there arises the advantage that time shortening of the subsequent process or the like is possible.

As described above, the ramp 200 of this embodiment is divided into a plurality of blocks like the attaching portion 221 and the arm holding portion 222; different high polymer materials are employed in the blocks; and the blocks are united in one by the locking means formed in the connecting surface of each block. Therefore, with respect to the ramp 200 of this embodiment, high polymer materials suitable for the functions required for each block can be selected for all of the blocks, and a ramp can be molded where each block is integrated.

In the ramp for an information recording disk apparatus according to the present invention, as described above, the ramp is divided into a plurality of blocks, different high polymer materials are employed in the blocks, and each block is provided on its connecting surface with locking means in undercut form. Since the blocks are mechanically connected and united in one by the locking means, no metal powder occurs. Also, irregularities on the outer surface of the ramp can be reduced. In addition, the ramp for an information recording disk apparatus according to the present invention, high polymer material, which is slight in creep deformation and small in thermal expansion coefficient, is employed in the attaching portion provided with a screw hole for fixing the ramp to the housing of the information recording disk apparatus by a screw, and high polymer material whose friction coefficient is small is employed in the guide portion against which the suspension arm slides. Therefore, in addition to nonoccurrence of metal powder, there is a little possibility that the ramp will loosen because of creep deformation.

In the ramp for an information recording disk apparatus according to the present invention, creep deformation occurs less in the high polymer material that is employed in the attaching portion than in the high polymer material that is employed in the arm holding portion. In addition, the thermal expansion coefficient of the high polymer material which is employed in the attaching portion is smaller than that of the high polymer material which is employed in the arm holding portion. As a result, the degree of deformation of the front edge of the guide portion due to heat is reduced, and the suspension arm can be moved without producing metal powder, even when temperature rises.

In the ramp for an information recording disk apparatus according to the present invention, the high polymer material which is employed in the attaching portion and the high polymer material which is employed in the arm holding portion have the same temperature range in a temperature condition required of the metal mold for molding both materials. As a result, no residual stress remains in moldings, and a single metal mold can have molding portions for molding both materials.

According to the present invention, a method of manufacturing a ramp for an information recording disk apparatus comprises the steps of: dividing the ramp into a plurality of blocks; molding the blocks subsequently with different high polymer materials; molding an undercut in a connecting surface of the first molded block which contacts the second molded block; and causing the undercut to function as part of a metal mold in molding the second molded block. Therefore, the blocks that are molded with different high polymer materials can be united in one.

In the ramp manufacturing method according to the present invention, the metal mold for molding a plurality of blocks molds one block at a first molding position, then rotates along with the molded block to a second molding position and molds another block. Therefore, the blocks can be united in one with a single metal mold.

Finally, the information recording disk apparatus of the present invention is capable of reducing creep deformation in the ramp caused by the tightening torque of the screw, since the ramp as set forth in any one of claims is fixed to the housing by an attaching screw.

What is claimed is:

1. A ramp for an information recording disk apparatus having a suspension arm to hold a magnetic head for writing to or reading information from a recording disk, and for retracting the suspension arm from the recording disk and holding the suspension arm, the ramp comprising:
   a plurality of blocks each having a connecting surface, each block being formed from a different high polymer material;
   a locking unit formed in each of the connecting surfaces; and wherein each of the blocks comprises:
      an attaching portion formed from high polymer material, wherein each attaching portion has a screw hole for fixing the ramp to a housing of the information recording disk apparatus with a screw; and
      an arm holding portion formed from high polymer material having a small coefficient of friction, the arm holding portion having a storing portion to hold the suspension arm retracted from the recording disk, and also having a guide portion against which the suspension arm slides for facilitating movement of the suspension arm in and out of the storing portion.

2. The ramp as set forth in claim 1, wherein creep deformation occurs at a lesser rate in the high polymer material of the attaching portion, than in the high polymer material of the arm holding portion.

3. The ramp as set forth in claim 1, wherein a coefficient of thermal expansion of the high polymer material of the attaching portion is smaller than that of the high polymer material of the arm holding portion.

4. The ramp as set forth in claim 1, wherein the high polymer material of the attaching portion is selected from the group consisting of polyetherimide (PEI), polyimide (PI), polycarbonate (PC), polyethersulphone (PES), and polyphenylenesulfide (PPS).

5. The ramp as set forth in claim 1, wherein the high polymer material of the attaching portion is mixed with glass fibers or carbon fibers.

6. The ramp as set forth in claim 1, wherein the high polymer material with a small friction coefficient of the arm holding portion is liquid crystal polymer (LCP).

7. The ramp as set forth in claim 1, wherein the high polymer material with a small friction coefficient of the arm holding portion contains polytetrafluoroethylene (PTFE).

8. The ramp as set forth in claim 1, wherein the high polymer material of the attaching portion and the high polymer material of the arm holding portion have a same temperature range in a temperature condition required of a metal mold for molding both materials.

9. The ramp as set forth in claim 8, wherein both high polymer materials have, in the temperature condition having the same temperature range, a temperature higher than a highest temperature that the ramp reaches when the information recording disk apparatus is installed or in use.

10. The ramp as set forth in claim 1, wherein the arm holding portion holds a suspension arm for a plurality of double-sided recording disks.

* * * * *